March 2, 1926.  
B. L. VAN ORMAN  
1,574,769  
AUTOMATIC MACHINE CONTROL MEANS  
Filed Oct. 15, 1923  
6 Sheets-Sheet 1
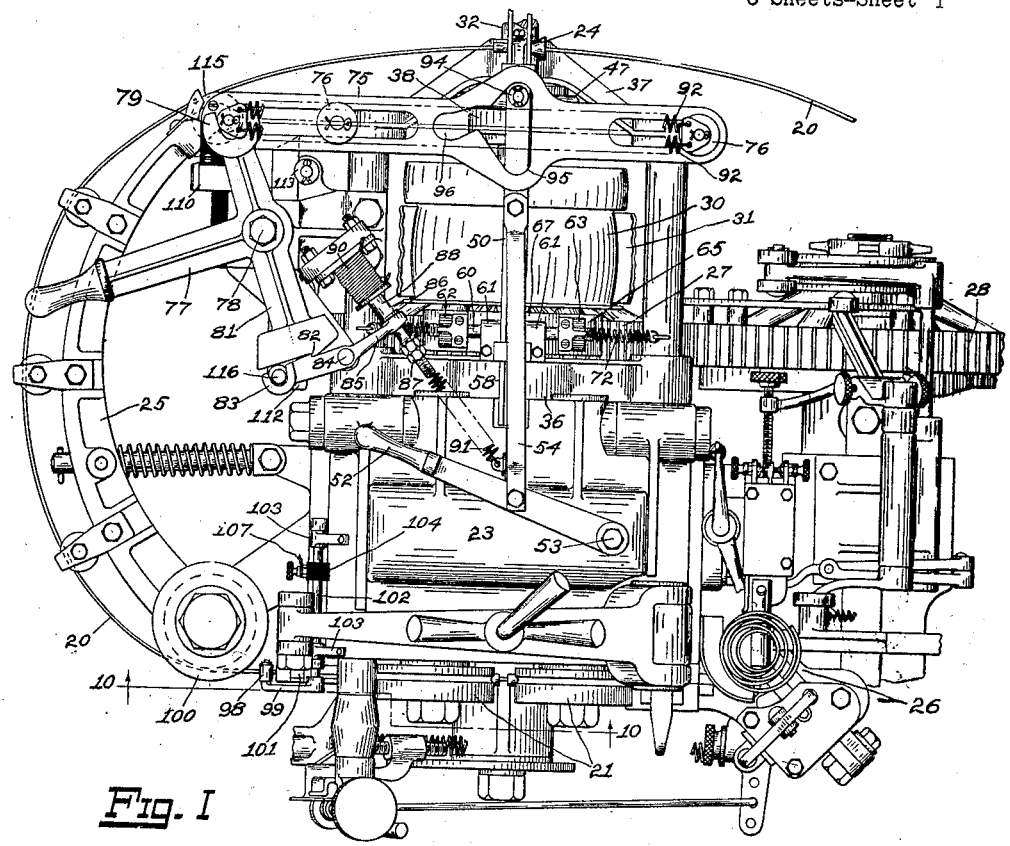
Fig. I
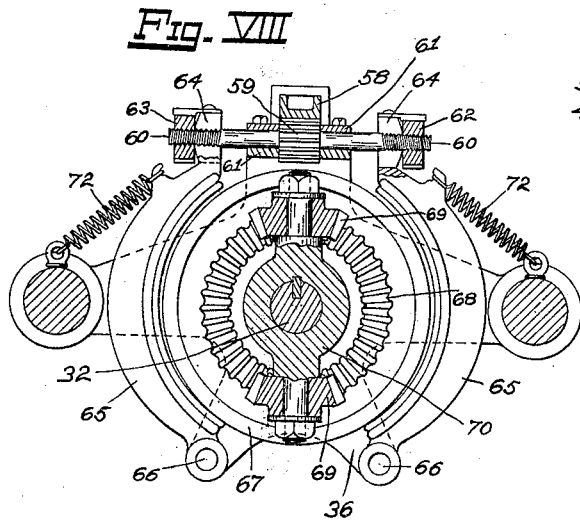
Fig. VIII
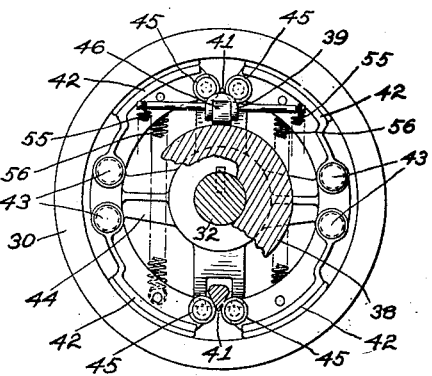
Fig. VII
INVENTOR.  
Bert L. Van Orman  
BY  
Chappell & Earl  
ATTORNEYS

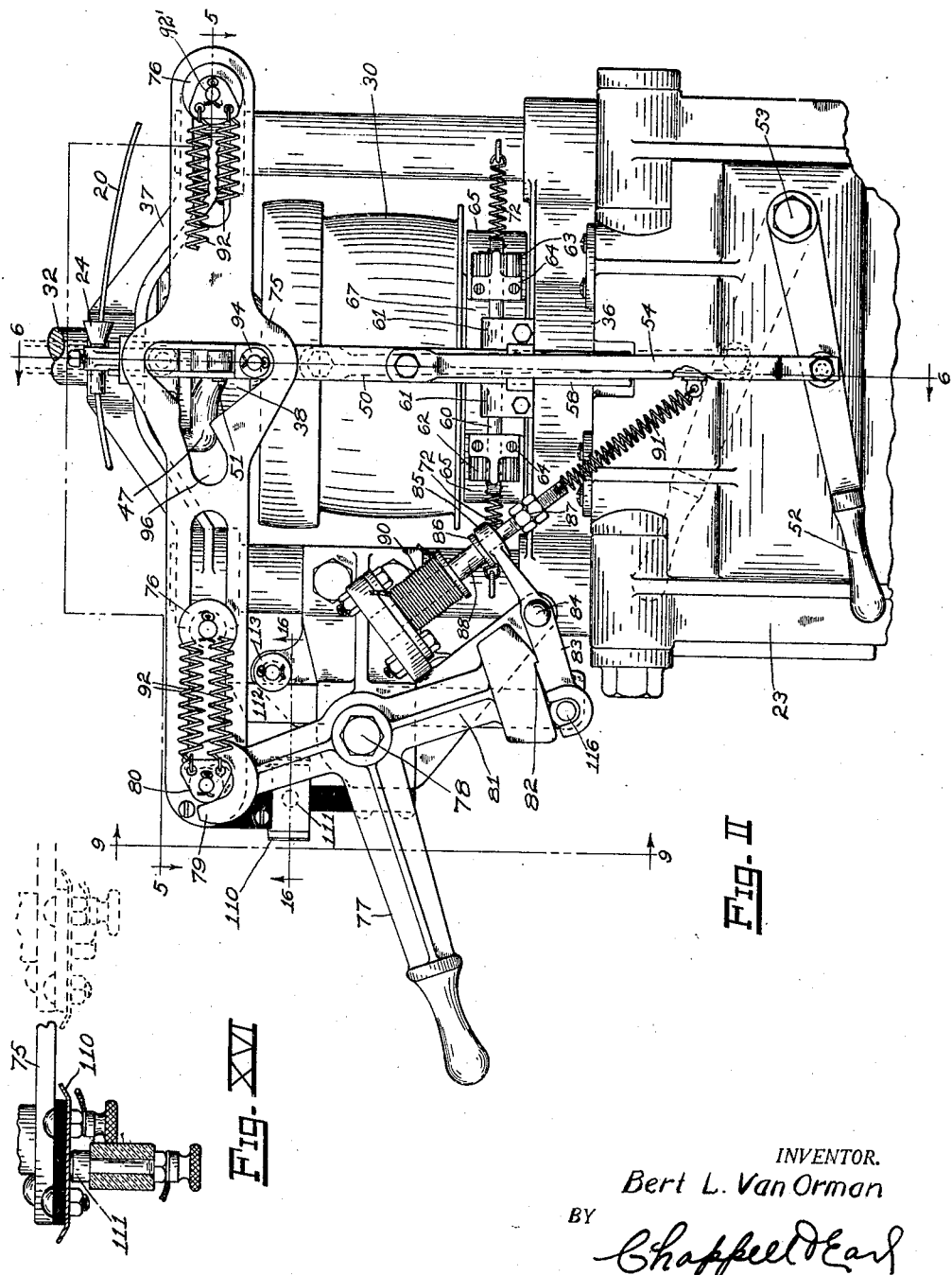

March 2, 1926.
B. L. VAN ORMAN
1,574,769
AUTOMATIC MACHINE CONTROL MEANS
Filed Oct. 15, 1923   6 Sheets-Sheet 3
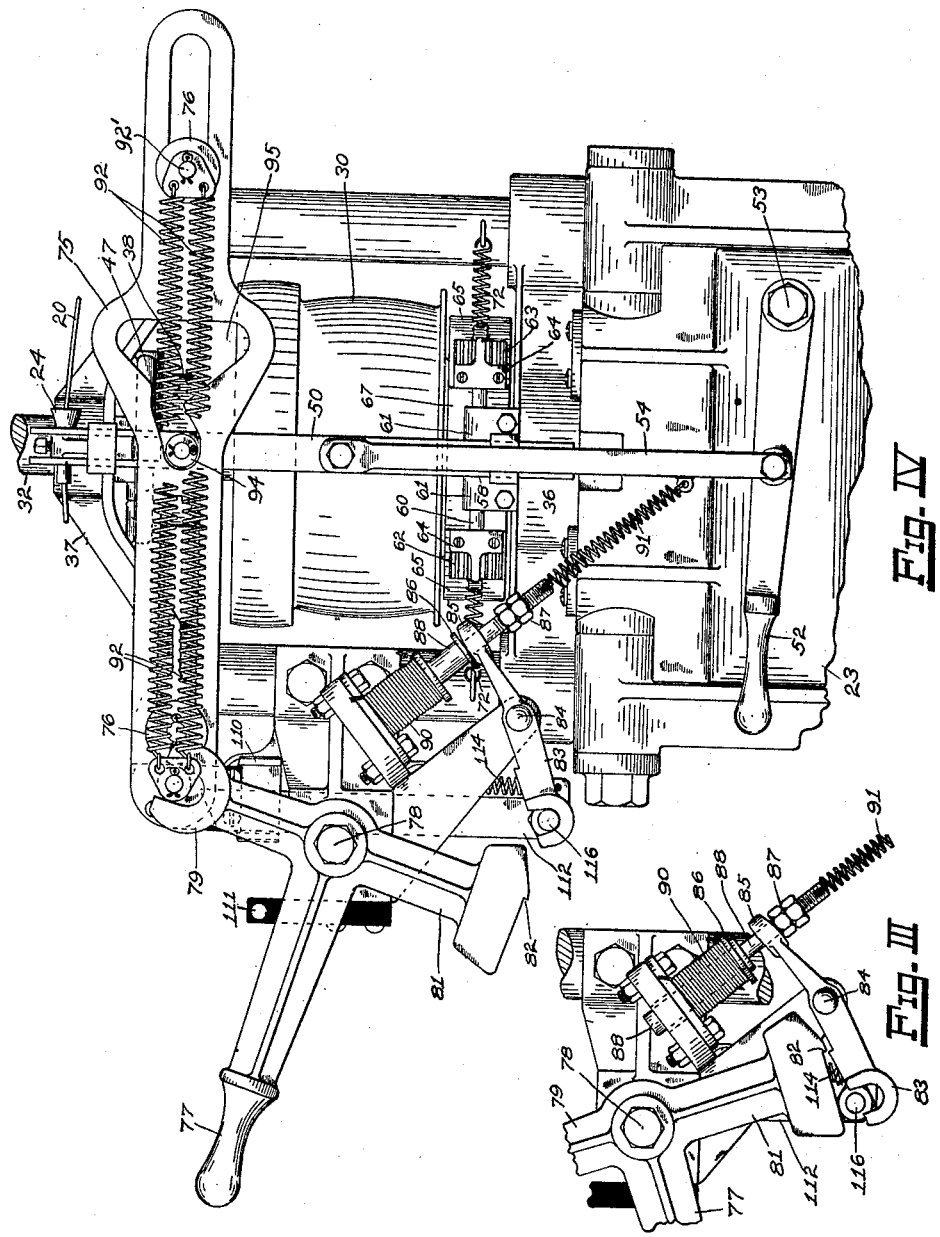
INVENTOR.
Bert L. Van Orman
BY Chappell & Earl
ATTORNEYS March 2, 1926.
B. L. VAN ORMAN
1,574,769
AUTOMATIC MACHINE CONTROL MEANS
Filed Oct. 15, 1923 6 Sheets-Sheet 4
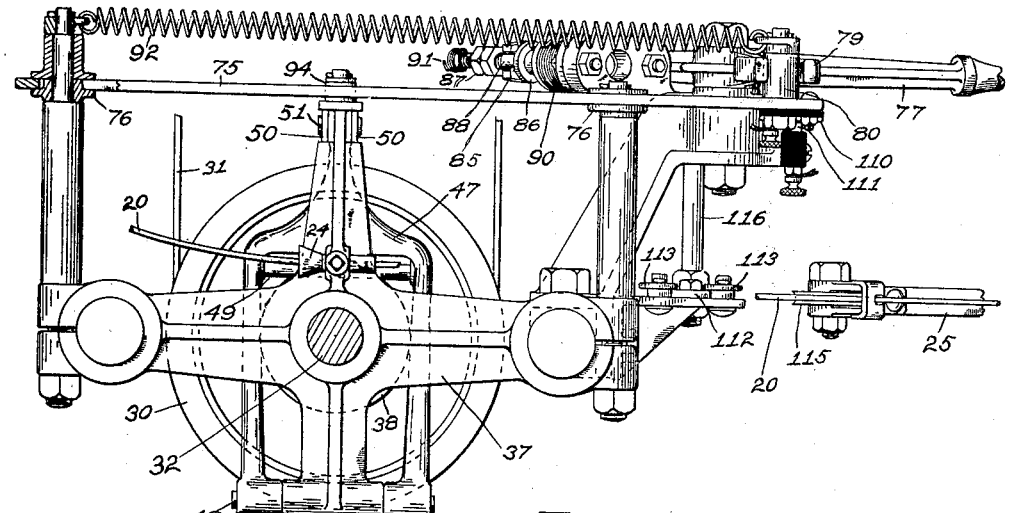
Fig. V
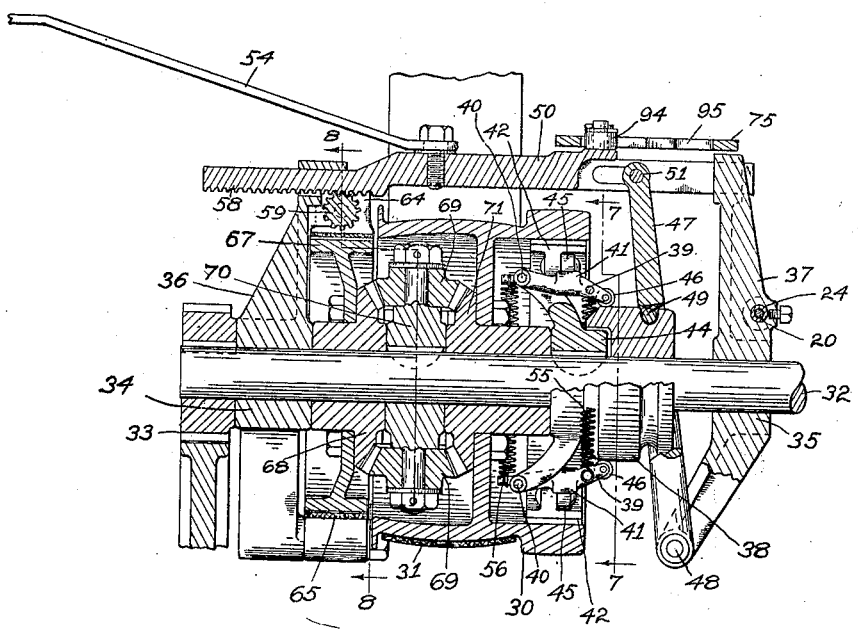
Fig. VI
INVENTOR.
Bert L. Van Orman
BY
Chappell Earl
ATTORNEYS

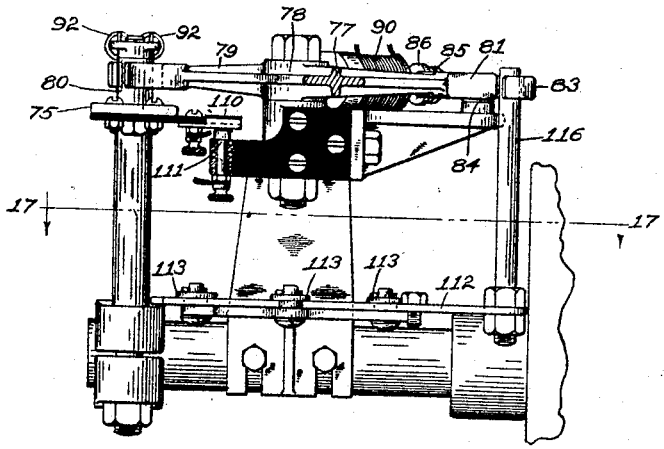
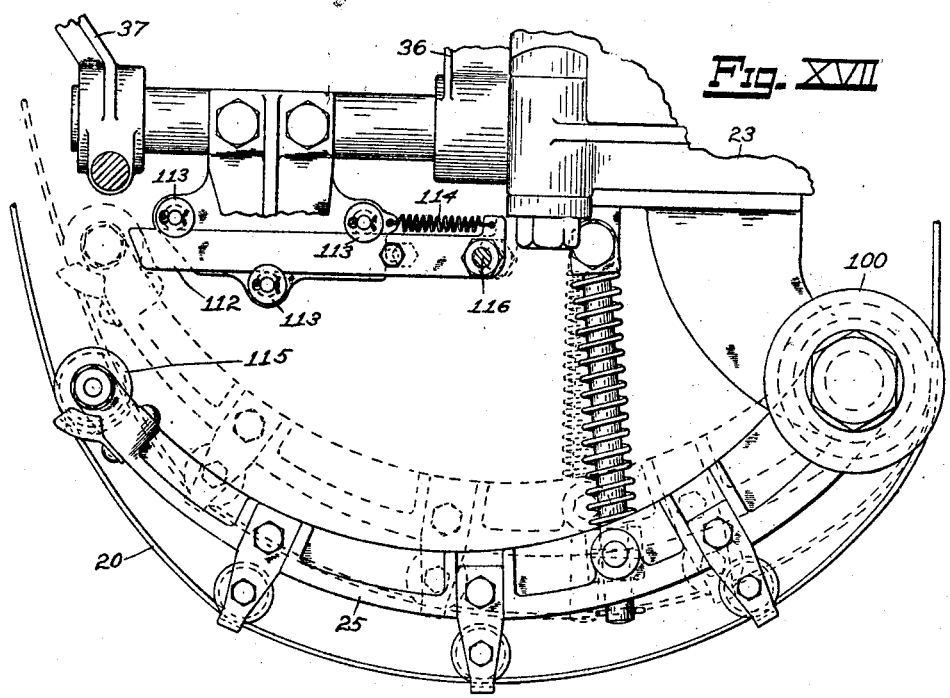

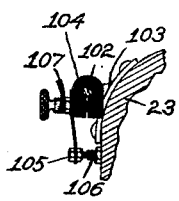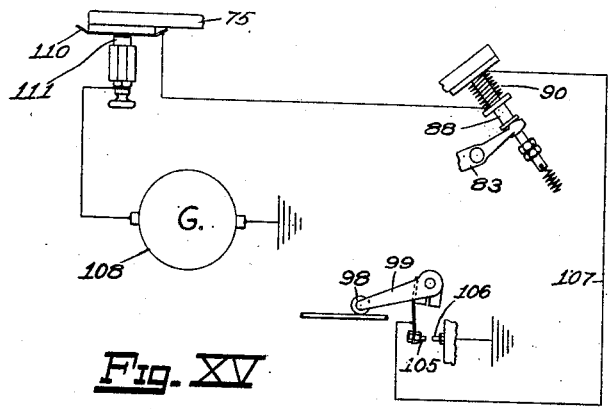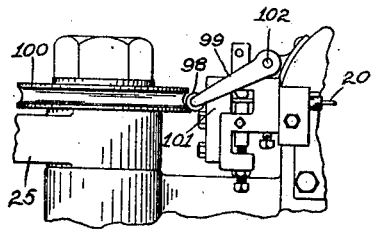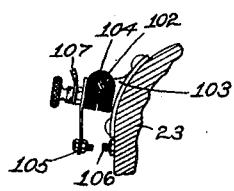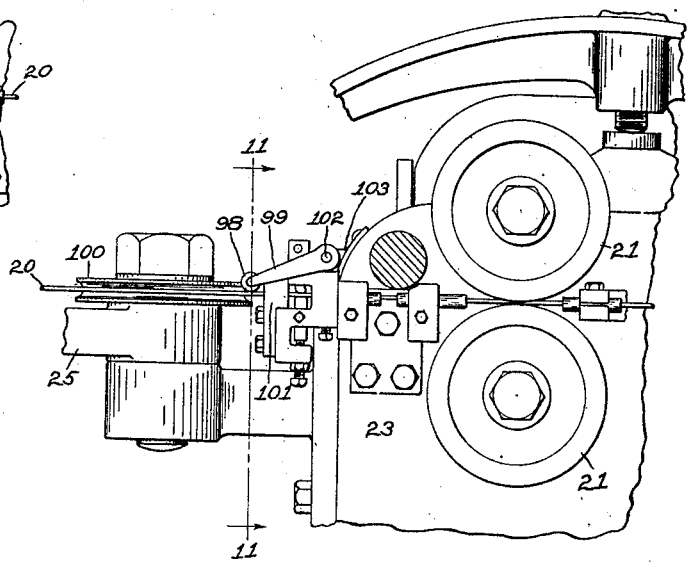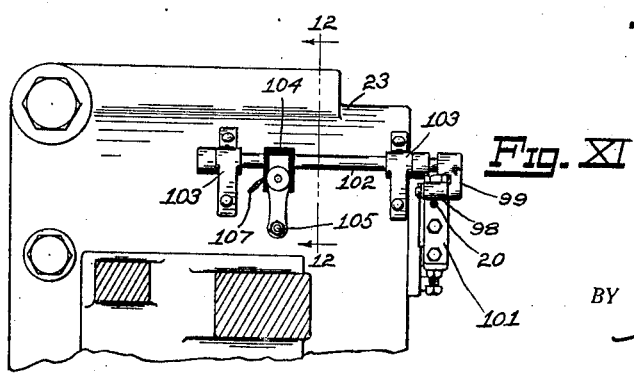

Patented Mar. 2, 1926.

1,574,769

UNITED STATES PATENT OFFICE.

BERT L. VAN ORMAN, OF HIGHLAND PARK, MICHIGAN, ASSIGNOR TO L. A. YOUNG INDUSTRIES, INC., OF DETROIT, MICHIGAN.

AUTOMATIC MACHINE-CONTROL MEANS.

Application filed October 15, 1923. Serial No. 668,677.

*To all whom it may concern:*

Be it known that I, BERT L. VAN ORMAN, a citizen of the United States, residing at Highland Park, county of Wayne, State of Michigan, have invented certain new and useful Improvements in Automatic Machine-Control Means, of which the following is a specification.

This invention relates to automatic machine control means actuated by abnormal conditions to disconnect the machine from the source of power or other means to prevent injury to the machine.

I have illustrated my present improvements as I have embodied them in a machine for the manufacture of coiled springs such as are used in vehicle and furniture seats, mattresses and the like. The general structure and operation of such machine is illustrated and described in my co-pending applications for Letters Patent, Serial No. 474,399, filed June 2, 1921, and Serial No. 595,995, filed October 22, 1922, and I have illustrated in the accompanying drawings only such portions of the machine as seem to me necessary to illustrate the practical use of my present improvements.

The main objects of this invention are:

First, to provide an improved means for automatically stopping a machine in the event of breakage of a part or the failure of a part to perform its normal function.

Second, to provide in a machine an improved control mechanism which is comparatively simple in its parts and not likely to become inoperative in use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I, Sheet 1, is a fragmentary plan view of a wire spring making machine embodying features of the invention, the transmission control parts being shown in low speed position.

Fig. II, Sheet 2, is an enlarged fragmentary plan view of the transmission control members in high speed position.

Fig. III, Sheet 3, is a fragmentary view of an electro mechanical tripping device in actuated position.

Fig. IV, Sheet 3, is a fragmentary view similar to Fig. II, showing the automatic control mechanism in position to neutralize the transmission.

Fig. V, Sheet 4, is a detail view partially in section on a line corresponding to line 5—5 of Fig. II.

Fig. VI, Sheet 4, is a detail section on a line corresponding to line 6—6 of Fig. II, illustrating details of a two-speed power transmitting mechanism.

Fig. VII, Sheet 1, is a detail view partially in section on a line corresponding to line 7—7 of Fig. VI, showing details of the high speed clutch.

Fig. VIII, Sheet 1, is a detail section on a line corresponding to line 8—8 of Fig. VI, showing details of the low speed clutch.

Fig. IX, Sheet 5, is a detail section on a line corresponding to line 9—9 of Fig. II.

Fig. X, Sheet 6, is an enlarged detail section on a line corresponding to line 10—10 of Fig. I, illustrating an automatic means for closing an electrical circuit, the parts being shown in open position.

Fig. XI, Sheet 6, is a detail section on a line corresponding to line 11—11 of Fig. X, illustrating further details of circuit closing means.

Fig. XII, Sheet 6, is a detail section on a line corresponding to line 12—12 of Fig. XI.

Fig. XIII, Sheet 6, is a fragmentary view similar to Fig. X, showing the circuit closing means in closed position.

Fig. XIV, Sheet 6, is a fragmentary view similar to Fig. XII, with the parts in closed position.

Fig. XV, Sheet 6, is a diagrammatic view of an electrical circuit for controlling the clutch releasing means.

Fig. XVI, Sheet 2, is an enlarged detail section on a line corresponding to line 16—16 of Fig. II, showing details of an automatic circuit breaker.

Fig. XVII, Sheet 5, is a fragmentary plan partially in section on a line corresponding to line 17—17 of Fig. IX, illustrating details of mechanical means for tripping the automatic control mechanism.

In the drawing, similar reference numerals refer to similar parts throughout the several views and the sectional views are taken looking in the direction indicated by little arrows at the ends of the sectional lines.

Since the operation of the machine is described in my applications before referred to, I will describe only such parts as seem desirable to a complete understanding of my present invention.

The stock wire 20 is drawn from a suitable source of supply by feed rollers 21 which are driven by suitable reduction gears enclosed in the gear housing 23 (see Fig. I). The wire is pulled through a guide 24 and around a tension arm 25, and is delivered to a coiling mechanism designated generally by the numeral 26. Counter gears 27 and 28 drive various parts of the machine.

Power from any suitable source imparts motion to a main drive pulley 30 by means of a belt 31. The pulley revolves at a constant and uniform speed, but through the medium of a transmission the machine may be driven at either of two different speeds or may be disconnected from the drive pulley. The construction of a satisfactory type of transmission is illustrated in detail in Figs. VI, VII and VIII.

A driven shaft 32, which is operatively connected with working parts of the machine by a suitable train of gears 33, serves as a support for the drive pulley 30 and other revolving parts of the transmission. The shaft 32 is rotatable in suitable bearings 34 and 35 in the supporting brackets 36 and 37 (see Fig. VI). When the transmission is in neutral, the pulley 30 is free to rotate on the shaft 32 while the latter remains at rest.

When the parts are in the positions shown in Figs. II and VI, a cone 38, which is free to slide endwise on the shaft 32, has been moved into position to actuate the levers 39 which are pivoted at 40, causing wedges 41 on the levers to spread and expand clutch shoes 42 into frictional engagement with the inside surface of the pulley 30 (see Fig. VII). The clutch shoes 42 are pivoted at 43 to a spider 44 which is secured to the shaft 32. Frictional engagement of the shoes 42 with the pulley 30 causes the shaft 32 to rotate as a unit with the pulley and drive the machine at high speed. The wedges 41 engage rollers 45 which are rotatably mounted on the brake shoes 42. The brake levers 39 are provided with rollers 46 coacting with the cone 38.

The position of the cone 38 is controlled by a shifting yoke 47 which is pivoted at 48 to the bracket 37 and carries a pin 49 engaging an annular groove in the cone. The yoke 47 is actuated by a slide bar 50 which is reciprocable in guides in the brackets 36 and 37, a laterally projecting pin 51 on the yoke engaging appropriate openings in the sides of the bar. To provide manual means of moving the slide bar 50, a hand lever 52 is pivoted at 53 to the housing 23 and connected to the bar by a link 54.

Tension springs 55 connecting the clutch levers 39, pull the wedges 41 out of engagement with the rollers 45 when the levers are released by the cone 38, thereby permitting springs 56, which are attached to oppositely disposed clutch shoes 42, to pull the latter out of frictional engagement with the pulley 30. When released from the clutch shoes, the pulley is free to rotate idly, allowing the machine to stop.

The slide bar 50 carries a rack 58 in mesh with a pinion 59 on a transverse shaft 60 which is rotatably mounted in bearings 61 on the bracket 36 (see Figs. VI and VIII). A portion of the shaft 60 at one end is threaded right hand and runs in a corresponding nut 62. The opposite end is threaded into a left hand nut 63. The nuts 62 and 63 bear against the outer faces of lugs 64 projecting upward from brake shoes 65 which are pivoted at 66 to the bracket 36. These clutch shoes lie in operative relation to a clutch drum 67, which is rotatably mounted on the driven shaft 32. A gear 68 on the clutch drum coacts with planetary pinions 69 on a spider 70 which is secured to the shaft 32. Another gear 71 secured to the drive pulley 30, also coacts with the pinions 69. When the transmission is in neutral, the spider 70 remains at rest with the shaft 32 while the gear 68 is rotated idly in a direction opposite to the rotation of the pulley 30. If the slide bar 50 is moved outward a certain distance past the position necessary to release the high speed clutch, the rack 58 rotates the pinion 59 a sufficient amount to cause the oppositely threaded nuts 62 and 63 to contract the clutch shoes 65 on the clutch drum 67. When the drum 67 is held stationary, the spider 70 is caused to rotate the shaft 32 at half the speed of the drive pulley 30 and drive the machine at low speed. The clutch shoes 65 are normally held out of engagement with the drum 67 by tension springs 72.

From the foregoing description it is apparent that, with the pulley 30 in motion, the position of the slide bar 50 determines the movements of the machine. If the slide bar is moved to the position shown in Figs. II and VI, the machine is driven at high speed. If the bar is moved outward to the position shown in Fig. I, the machine is driven at low speed. The machine is stopped by moving the bar to an intermediate position.

In addition to the means provided for controlling the transmission manually, it is desirable that automatic means be provided to stop the machine without delay when certain abnormal conditions of operation arise. A preferred type of automatic control means consists of the following described mechanism.

A plate-like cam member 75 is supported by the guide rollers 76 for reciprocating movement transversely of the control slide bar 50. This cam member is normally held in position, shown in Fig. I, by a T-shaped locking lever 77 provided with a handle so that it may be manually adjusted to locking position. This locking lever is pivoted at 78 and one end thereof terminates in a forked end which embraces a roller 80 mounted on the cam member. The opposite arm 81 has a keeper 82 adapted to coact with a latch 83 pivoted at 84. When the latch is engaged with the locking lever, the cam member is locked in open position and this is its normal position. The latch 83 has an arm forked at 85 to embrace the stem of the armature 88 between the collar-like tappet 86 and the adjustable tappet 87, the tappet 87 being nuts threaded upon the stem for adjustment.

The electro-magnet or solenoid 90 is in circuit with a source of electricity as will be hereinafter pointed out.

The tappet 86 of the armature is held normally in contact with the latch 83 by a spring 91, thus holding the catch in engagement with the locking lever 77. When the solenoid is energized, the tappet 87 strikes the latch, releasing the locking lever (see Fig. III). The release of the locking lever allows the coiled springs 92 attached to the cam member 75 and to a stationary part 92' of the machine to actuate the cam member to the position shown in Fig. IV. A roller 94 carried by the control bar 50 projects into the cam opening 95 of the cam member.

When the locking lever is engaged by the catch, as shown in Fig. II, the control bar lies beneath the wide portion of the cam opening which is wide enough to allow the roller 94 to move through its entire range of movement.

With the parts in this position, the machine is free to be started and stopped at any time by means of the hand control lever 52. The parts are shown in low speed position in Fig. I and in high speed position in Fig. II. When the cam plate is moved to the position shown in Fig. III the narrow part of the cam opening is carried over the control bar and the converging sides of the cam, forcing the transmission control bar 50 from either its high or low speed position, as the case may be, into neutral position. When the cam plate is in actuated position, the transmission can not be shifted from neutral. This is of advantage from the standpoint of safety to the machine since the necessity of re-setting the locking lever 77 before starting the machine is an indication to the operator that trouble has occurred and should be located and corrected before attempting to resume operations.

The solenoid magnet 90 may be electrically connected with any number of circuit closing means located at various points on the machine. Several different devices for closing a control circuit are shown in my said co-pending application, Serial No. 595,995. I deem it sufficient to illustrate and describe the operation of one of such circuit closing means:

As the wire 20 is supplied to the machine in bales containing a limited supply of wire, making necessary the occasional replenishment of wire and rethreading of the machine, it is desirable that the machine be stopped as soon as the last end of the wire has passed the feed rollers 21.

When wire is in place in the machine, a roller 98 mounted on a rock arm 99, is supported on the wire 20 between guides 100 and 101 (see Figs. I, X and XI). The rock arm 99 is secured to a rock shaft 102 which is mounted in bearings 103 on the housing 23. An insulating block 104 also secured to the rock shaft 102, carries a contact point 105 which coacts with another contact point 106 on the housing 23. The contact 105 is connected by a conductor 107 with the solenoid magnet 90. Whenever the roller 98 is supported by wire in the guides 100 and 101, the contact 105 is held away from the contact 106 (see Figs. X and XII). When the supply of wire becomes exhausted, the roller 98 and rock arm 99 are allowed to fall (see Fig. XIII) and swing the contact 105 against the contact 106 (see Fig. XIV).

In Fig. XV, I have shown a complete electrical circuit in which the current is supplied by a generator 108. The frame and other metallic parts of the machine serve as a ground for the circuit. Whenever the roller 98 is held up by wire in the machine, the circuit is open. When exhaustion of the wire supply allows the contact point 105 to make contact with the point 106, the circuit is closed, permitting the generator 108 to energize the solenoid magnet 90 and causing the cam plate 75 to be released to neutralize the transmission.

An automatic circuit breaker, suitable for use with this form of control, consists of a contact plate 110, attached in insulated relation to the cam plate 75 and making electrical contact with a stationary conductor 111 whenever the cam plate is in open position, (see Fig. XVI). As the cam plate moves to neutralize the transmission, the contact plate 110 is carried away from the conductor 111 opening the electrical circuit that energizes the solenoid magnet and preventing a useless if not injurious flow of current.

A means for releasing the cam plate 75 mechanically, consists of a slide bar 112 mounted within guide rollers 113 and normally projected by a spring 114 into the path of the wire feed tension arm 25 (see Fig. XVII). The slide bar is not within the normal range of movement of the tension arm but if there is an interruption in the feeding of the wire to the tension arm, as when wire becomes tangled in the supply bale, the tension arm is pulled inwardly until the wire guide wheel 115 strikes the beveled end of the bar 112 sliding it back against the pull of the spring 114 (see dotted lines in Fig. XVII). The slide bar 112 carries an upright 116 that engages the end of the latch 83 to release the locking lever 77.

I have illustrated and described my improvements in an embodiment which I have found very practical. I have not attempted to illustrate and describe certain modifications and adaptations which I contemplate as I believe the disclosure made will enable those skilled in the art to which my invention relates to embody or adapt the same as may be desired.

Having thus described my invention, what I claim as new and desire to secure by Letters Patent, is:

1. The combination with the machine to be controlled, of driving means therefor comprising a driven shaft, a driving pulley rotatable on said shaft, a clutch for connecting said pulley to said shaft, a driving connection from said pulley to said shaft, an actuating means for said driving connection, a control bar operatively connected to said clutch and to said driving connection actuating means adapted to actuate one or the other when at the ends of its throw and to disconnect both when in an intermediate position, a release member mounted for reciprocating movement transversely of said control bar and having a cam opening therein with converging sides, said control bar being provided with a coacting part whereby the actuation of said cam member moves said control bar to neutral position, a spring for actuating said release member, a means for manually adjusting said control bar, a manually adjusted pivotally mounted locking lever operatively connected to said release member, a catch for said locking lever, an electromagnet operatively associated with said catch and with said machine, and a tripping member independent of said electromagnet operatively associated with said catch and said machine.

2. The combination with the machine to be controlled, of driving means therefor comprising a driven shaft, a driving pulley rotatable on said shaft, a clutch for connecting said pulley to said shaft, a driving connection from said pulley to said shaft, an actuating means for said driving connection, a control bar operatively connected to said clutch and to said driving connection actuating means adapted to actuate one or the other when at the ends of its throw and to disconnect both when in an intermediate position, a release member mounted for reciprocating movement transversely of said control bar and having a cam opening therein with converging sides, said control bar being provided with a coacting part whereby the actuation of said cam member moves said control bar to neutral position, a spring for actuating said release member, a means for manually adjusting said control bar, a manually adjusted pivotally mounted locking lever operatively connected to said release member, a catch for said locking lever, and an electromagnet operatively associated with said catch and with said machine.

3. The combination with the machine to be controlled, of a variable speed driving means therefor, a reciprocating control bar for said variable speed driving means, a release member mounted for reciprocating movement transversely of said control bar and having a cam opening therein, said control bar being provided with a coacting part, a spring for actuating said release member, a means for manually adjusting said control bar, a manually adjusted pivotally mounted locking lever operatively connected to said release member, a catch for said locking lever, an electromagnet operatively associated with said catch and with said machine, and a tripping member independent of said electromagnet operatively associated with said catch and said machine.

4. The combination with the machine to be controlled, of a variable speed driving means therefor, a reciprocating control bar for said variable speed driving means, a release member mounted for reciprocating movement transversely of said control bar and having a cam opening therein, said control bar being provided with a coacting part, a spring for actuating said release member, a means for manually adjusting said control bar, a manually adjusted pivotally mounted locking lever operatively connected to said release member, a catch for said locking lever, and an electromagnet operatively associated with said catch and with said machine.

5. The combination with the machine to be controlled, of a variable speed driving means therefor, a reciprocating control bar for said variable speed driving means, a release member mounted for reciprocating movement transversely of said control bar and having a cam opening therein, said control bar being provided with a coacting part, a spring for actuating said release member, a means for manually adjusting said control bar, a manually adjusted locking lever operatively connected to said release member, a catch for said locking lever, and means for automatically releasing said catch operatively associated with the machine.

6. The combination with the machine to be controlled provided with a yielding member over which the stock entering the machine is passed and a circuit closing means held normally in open position by the stock, of a variable speed driving means for said machine, a reciprocating control member operatively associated with said driving means so that it is in neutral when the control member is in an intermediate position, means for manually adjusting said control member, a spring actuated releasing member mounted to reciprocate transversely of said control member and provided with a cam opening having converging sides, said control member having a part engaging said opening whereby the control member is moved to its neutral position by the actuation of said releasing member, a manually adjusted locking means for holding said releasing member in its actuated position, a means for releasing said locking means including an electromagnet in the circuit of said circuit closing means, and means for releasing said locking means operatively associated with said yielding member of said machine.

7. The combination with the machine to be controlled provided with a circuit closing means held normally in open position by the stock, of a variable speed driving means for said machine, a reciprocating control member operatively associated with said driving means so that it is in neutral when the control member is in an intermediate position, means for manually adjusting said control member, a spring actuated releasing member mounted to reciprocate transversely of said control member and provided with a cam opening having converging sides, said control member having a part engaging said opening whereby the control member is moved to its neutral position by the actuation of said releasing member, a manually adjusted locking means for holding said releasing member in its actuated position, and a means for releasing said locking means including an electromagnet in the circuit of said circuit closing means.

8. The combination with the machine to be controlled, of a variable speed driving means for said machine, a reciprocating control member operatively associated with said driving means so that it is in neutral when the control member is in an intermediate position, means for manually adjusting said control member, a spring actuated releasing member mounted to reciprocate transversely of said control member and provided with a cam opening having converging sides, said control member having a part engaging said opening whereby the control member is moved to its neutral position by the actuation of said releasing member, a locking means for holding said releasing member in its actuated position, and means for automatically tripping said locking means operatively associated with the machine.

9. The combination with the machine to be controlled and the stock operated upon by the machine, of a variable speed driving means for said machine, a manually adjustable control member for said driving means, a spring actuated releasing member for said control member, a manually adjusted locking means for said releasing member, a circuit closing means held normally in open position by the stock and a means for releasing said locking means including an electromagnet in the circuit of said circuit closing means.

10. The combination with the machine to be controlled, of a variable speed driving means for said machine, a control member for said variable speed driving means selectively adjustable to vary the speed, a spring actuated releasing member for said control member, a manually adjusted locking means for said releasing member, and means for automatically tripping said locking means operatively associated with the machine.

11. The combination with the machine to be controlled, of a variable speed driving means therefor, a control member for said variable speed driving means, a release member for actuating said control member to neutral position, a spring for actuating said release member, a means for manually adjusting said control member, a locking means operatively connected to said release member, a catch for said locking means, an electromagnet operatively associated with said catch and with said machine, and a tripping member independent of said electromagnet operatively associated with said catch and said machine.

12. The combination with the machine to be controlled, of a variable speed driving means therefor, a selectively adjustable control member for said variable speed driving means whereby the speed of the machine is determined, a release member for actuating said control member to neutral position, a spring for actuating said release member, a means for manually adjusting said control member, a locking means operatively connected to said release member, a catch for said locking means, and an electromagnet operatively associated with said catch and with said machine.

13. The combination with the machine to be controlled, of a variable speed driving means therefor, a selectively adjustable control member for said variable speed driving means whereby the speed of the machine is determined, a release member for actuating said control member to neutral position, a spring for actuating said release member, a means for manually adjusting said control member, a locking means operatively connected to said release member, and an automatic means for tripping said locking means.

14. The combination of a driving means, a control member therefor adapted for manual adjustment, a release member for automatically actuating said control member to neutral position, a locking member for said release member whereby it is normally held in inoperative position permitting the manual adjustment of said control member, a latch for said locking member, an electromagnet operatively associated with said latch, and a mechanically actuated tripping member operatively associated with said latch.

15. The combination of a driving means, a control member therefor adapted for manual adjustment, a release member for automatically actuating said control member to neutral position, a locking member for said release member whereby it is normally held in inoperative position permitting the manual adjustment of said control member, a latch for said locking member, and an electromagnet operatively associated with said latch.

In witness whereof, I have hereunto set my hand.

BERT L. VAN ORMAN.